United States Patent [19]

Shaver

[11] Patent Number: 5,473,766
[45] Date of Patent: Dec. 5, 1995

[54] SIGNAL ROUTING CIRCUIT FOR INTERCHANGEABLE MICROPROCESSOR SOCKET

[75] Inventor: Charles N. Shaver, Cypress, Tex.

[73] Assignee: Compaq Computer Corp., Houston, Tex.

[21] Appl. No.: 298,362

[22] Filed: Aug. 30, 1994

Related U.S. Application Data

[63] Continuation of Ser. No. 757,722, Sep. 11, 1991, abandoned.

[51] Int. Cl.⁶ .................................................. G06F 13/00
[52] U.S. Cl. ..................... 395/500; 364/229; 364/232.8; 364/238.6; 364/239; 364/284.1; 364/DIG. 1
[58] Field of Search ..................................... 395/325, 500

[56] References Cited

U.S. PATENT DOCUMENTS

| | | | |
|---|---|---|---|
| 4,281,392 | 7/1981 | Grants et al. | |
| 4,716,526 | 12/1987 | Mori et al. | |
| 4,845,611 | 7/1989 | Turlakov | 395/500 |
| 5,025,412 | 6/1991 | Dalrymple et al. | 395/325 |
| 5,109,506 | 4/1992 | Begun | 395/575 |
| 5,165,037 | 11/1992 | Culley | 395/800 |
| 5,191,657 | 3/1993 | Ludwig et al. | 395/325 |
| 5,321,827 | 6/1994 | Lu et al. | 395/500 |
| 5,325,490 | 6/1994 | Brasseur | 395/325 |

FOREIGN PATENT DOCUMENTS

| | | |
|---|---|---|
| 0401960 | 12/1990 | European Pat. Off. . |
| 0411806 | 6/1991 | European Pat. Off. . |
| 0231422 | 4/1990 | United Kingdom . |

OTHER PUBLICATIONS

Michael Slater, "Intel's 486SX Aims To Displace 386DX," Microprocessor Report, vol. 5, No. 8, pp. 3–30 To 3–34 (May 1, 1991).

P. Jackson, "Up, Up and Away," Micro Decision, Apr. 1991, pp. 86–87.

Intel Corp. 486SX Data Book, Diagram & Text for Performance Upgrade Circuit.

*Primary Examiner*—Kevin J. Teska
*Assistant Examiner*—Ayni Mohamed
*Attorney, Agent, or Firm*—Pravel, Hewitt, Kimball & Krieger

[57] ABSTRACT

A switching circuit controls the routing of various signals of the computer system to and from the various pins of a microprocessor socket. A microprocessor rests in the socket and can be removed and replaced by another microprocessor. Variations in the pin arrangements of the two processors can be compensated for by appropriately setting the switches on the processor card. The use of 486SX, 487SX and 486DX microprocessors is illustrated in a single socket.

10 Claims, 5 Drawing Sheets

|   | 17 | 16 | 15 | 14 | 13 | 12 | 11 | 10 | 9 | 8 | 7 | 6 | 5 | 4 | 3 | 2 | 1 |   |
|---|---|---|---|---|---|---|---|---|---|---|---|---|---|---|---|---|---|---|
| S | ADS# | A4 | A6 | VSS | A10 | VSS | VSS | VSS | VSS | VSS | A12 | VSS | A14 | NC | A23 | A26 | A27 | S |
| R | NC | BLAST* | A3 | VCC | A8 | A11 | VCC | VCC | VCC | VCC | A15 | VCC | A18 | VSS | VCC | A25 | A28 | R |
| Q | PCHK | PLOCK* | BREQ | A2 | A7 | A5 | A9 | A13 | A16 | A20 | A22 | A24 | A21 | A19 | A17 | VSS | A31 | Q |
| P | VSS | VCC | HLDA |   |   |   |   |   |   |   |   |   |   |   | A30 | A29 | D0 | P |
| N | W/R* | M/IO* | LOCK* |   |   |   |   |   |   |   |   |   |   |   | DP0 | D1 | D2 | N |
| M | VSS | VCC | D/C* |   |   |   |   |   |   |   |   |   |   |   | D4 | VCC | VSS | M |
| L | VSS | VCC | PWT |   |   |   |   |   |   |   |   |   |   |   | D7 | D6 | VSS | L |
| K | VSS | VCC | BE0* |   |   |   |   |   |   |   |   |   |   |   | D14 | VCC | VSS | K |
| J | PCD | BE1* | BE2* |   |   |   |   |   |   |   |   |   |   |   | D16 | D5 | VCC | J |
| H | VSS | VCC | BRDY* |   |   |   |   |   |   |   |   |   |   |   | DP2 | D3 | VSS | H |
| G | VSS | VCC |   |   |   |   |   |   |   |   |   |   |   |   | D12 | VCC | VSS | G |
| F | BE3* | RDY* | KEN* |   |   |   |   |   |   |   |   |   |   |   | D15 | D8 | DP1 | F |
| E | VSS | VCC | HOLD |   |   |   |   |   |   |   |   |   |   |   | D10 | VCC | VSS | E |
| D | BOFF* | BS8* | A20M* |   |   |   |   |   |   |   |   |   |   |   | D17 | D13 | D9 | D |
| C | BS16# | RESET | FLUSH | FERR# | NC | NC | NC | NC | D30 | D28 | D26 | D27 | VCC | VCC | CLK | D18 | D11 | C |
| B | EADS* | NC | NMI | NC | NC | NC | VCC | NC | VCC | D31 | VCC | D25 | VSS | VSS | VSS | D21 | D19 | B |
| A | AHOLD | INTR | IGNNE* | NC | NC | NC | VSS | NC | VSS | D29 | VSS | D24 | DP3 | D23 | NC | D22 | D20 | A |
|   | 17 | 16 | 15 | 14 | 13 | 12 | 11 | 10 | 9 | 8 | 7 | 6 | 5 | 4 | 3 | 2 | 1 |   | i486™ MICROPROCESSOR PINOUT
TOP SIDE VIEW

*FIG. 2A*

487™ SX™ MATH COPROCESSOR PINOUT
TOP SIDE VIEW

*FIG. 2B*

|   | 17 | 16 | 15 | 14 | 13 | 12 | 11 | 10 | 9 | 8 | 7 | 6 | 5 | 4 | 3 | 2 | 1 |   |
|---|----|----|----|----|----|----|----|----|---|---|---|---|---|---|---|---|---|---|
| S | ADS# | A4 | A6 | VSS | A10 | VSS | VSS | VSS | VSS | VSS | A12 | VSS | A14 | NC | A23 | A26 | A27 | S |
|   | O | O | O | O | O | O | O | O | O | O | O | O | O | O | O | O | O |   |
| R | NC | BLAST* | A3 | VCC | A8 | A11 | VCC | VCC | VCC | VCC | A15 | VCC | A18 | VSS | VCC | A25 | A28 | R |
|   | O | O | O | O | O | O | O | O | O | O | O | O | O | O | O | O | O |   |
| Q | PCHK | PLOCK* | BREQ | A2 | A7 | A5 | A9 | A13 | A16 | A20 | A22 | A24 | A21 | A19 | A17 | VSS | A31 | Q |
|   | O | O | O | O | O | O | O | O | O | O | O | O | O | O | O | O | O |   |
| P | VSS | VCC | HLDA |   |   |   |   |   |   |   |   |   |   |   | A30 | A29 | D0 | P |
|   | O | O | O |   |   |   |   |   |   |   |   |   |   |   | O | O | O |   |
| N | W/R* | M/IO* | LOCK* |   |   |   |   |   |   |   |   |   |   |   | DP0 | D1 | D2 | N |
|   | O | O | O |   |   |   |   |   |   |   |   |   |   |   | O | O | O |   |
| M | VSS | VCC | D/C* |   |   |   |   |   |   |   |   |   |   |   | D4 | VCC | VSS | M |
|   | O | O | O |   |   |   |   |   |   |   |   |   |   |   | O | O | O |   |
| L | VSS | VCC | PWT |   |   |   |   |   |   |   |   |   |   |   | D7 | D6 | VSS | L |
|   | O | O | O |   |   |   |   |   |   |   |   |   |   |   | O | O | O |   |
| K | VSS | VCC | BE0* |   |   |   |   |   |   |   |   |   |   |   | D14 | VCC | VSS | K |
|   | O | O | O |   |   | 486™ SX™ MICROPROCESSOR PINOUT |   |   |   |   |   |   |   |   | O | O | O |   |
| J | PCD | BE1* | BE2* |   |   | TOP SIDE VIEW |   |   |   |   |   |   |   |   | D16 | D5 | VCC | J |
|   | O | O | O |   |   |   |   |   |   |   |   |   |   |   | O | O | O |   |
| H | VSS | VCC | BRDY* |   |   |   |   |   |   |   |   |   |   |   | DP2 | D3 | VSS | H |
|   | O | O | O |   |   |   |   |   |   |   |   |   |   |   | O | O | O |   |
| G | VSS | VCC |   |   |   |   |   |   |   |   |   |   |   |   | D12 | VCC | VSS | G |
|   | O | O | O |   |   |   |   |   |   |   |   |   |   |   | O | O | O |   |
| F | BE3* | RDY* | KEN* |   |   |   |   |   |   |   |   |   |   |   | D15 | D8 | DP1 | F |
|   | O | O | O |   |   |   |   |   |   |   |   |   |   |   | O | O | O |   |
| E | VSS | VCC | HOLD |   |   |   |   |   |   |   |   |   |   |   | D10 | VCC | VSS | E |
|   | O | O | O |   |   |   |   |   |   |   |   |   |   |   | O | O | O |   |
| D | BOFF* | BS8* | A20M* |   |   |   |   |   |   |   |   |   |   |   | D17 | D13 | D9 | D |
|   | O | O | O |   |   |   |   |   |   |   |   |   |   |   | O | O | O |   |
| C | BS16# | RESET | FLUSH | NC | NC | NC | NC | NC | D30 | D28 | D26 | D27 | VCC | VCC | CLK | D18 | D11 | C |
|   | O | O | O | O | O | O | O | O | O | O | O | O | O | O | O | O | O |   |
| B | EADS* | NC | NC | NC | NC | NC | VCC | NC | VCC | D31 | VCC | D25 | VSS | VSS | VSS | D21 | D19 | B |
|   | O | O | O | O | O | O | O | O | O | O | O | O | O | O | O | O | O |   |
| A | AHOLD | INTR | NMI | NC | NC | NC | VSS | NC | VSS | D29 | VSS | D24 | DP3 | D23 | NC | D22 | D20 | A |
|   | O | O | O | O | O | O | O | O | O | O | O | O | O | O | O | O | O |   |
|   | 17 | 16 | 15 | 14 | 13 | 12 | 11 | 10 | 9 | 8 | 7 | 6 | 5 | 4 | 3 | 2 | 1 |   |

FIG. 2C

SIGNAL ROUTING CIRCUIT FOR INTERCHANGEABLE MICROPROCESSOR SOCKET

This is a continuation of application Ser. No. 07/757,722 filed on Sep. 11, 1991, and now abandoned.

BACKGROUND OF THE INVENTION

1. Field of the Invention

This invention relates to personal computers and more particularly to personal computers which utilize a microprocessor that can be replaced to upgrade performance.

2. Description of the Related Art

Advancements in computer technology proceed at a startling rate. Improvements in the speed and the capabilities of modern computers advance so quickly that the preceding generation of technology has hardly reached the market before it is rendered obsolete by faster, better computers. While the pace of advancement is a marvel to scientists, engineers, and enthusiasts, it can be frustrating to the consumer trying to keep pace with the industry.

Although the price of personal computers has dropped dramatically over the last 20 years, computers still represent major investments for individual and business consumers. Unfortunately, as new technology develops, a computer becomes obsolete and its market value plummets. Consequently, replacing an old system with a new one involves spending large sums for the new computer and receiving very little return on the old one.

At the heart of advancements in computer technology lie the improvements in microprocessor performance. To receive the benefits of an advanced microprocessor, a consumer previously had to buy an entire computer and throw out his old one, possibly retaining a few interchangeable components. Although many consecutive computer designs by various manufacturers were nearly identical, the microprocessor designs varied enough that the systems were incompatible. As a result, an old processor could not be simply replaced with a new one; the entire computer had to be disposed of and replaced with a modern system.

In an effort to reduce the cost of upgrading computer systems, manufacturers began to explore ways in which the processor could be replaced and still preserve the remainder of the computer system. Some manufacturers produced computers where the microprocessor could be replaced by changing the computer's microprocessor circuit card. To improve the performance of a computer system, a consumer was only required to buy a new processor card. The old card could be removed from the computer and substituted with the new card.

Although this was an improvement, this method of upgrading remained costlier than necessary. Because the entire processor card had to be replaced, all of the circuitry, components, and chips on the old processor card were wasted. The consumer had to absorb not only the cost of the new processor, but the cost of all of the components on the new card and the expenses incurred in manufacturing the compatible card.

One side effect of the use of interchangeable processor cards is that the available space for components is relatively small. If the processor cards are large, then replacement becomes very expensive and possibly not cost effective. If the cards become too small, insufficient functions can be located on the card and performance would suffer. So space is at a premium.

One line of microprocessors in favor are the Intel Corp., which form the basis for personal computers compatible with those originally produced by International Business Machines Corp. such as the IBM PC/AT. Currently the line extends from the 8088 to the 80486. Particularly favored units include the 386SX, the 386DX, the 486SX and the 486DX, in general order of increased performance. Therefore it is common to use these microprocessors on the interchangeable processor cards. Of particular interest are the 486DX, 486SX and companion 487SX. The 486SX can be considered as an 486DX without the internal numeric coprocessor. When a numeric coprocessor is necessary, an 487SX is inserted into the system. Therefore, according to recommendations from Intel, two full sockets are necessary on the processor card to allow numeric coprocessor support. This creates major space problems on already crowded interchangeable processor cards.

SUMMARY OF THE PRESENT INVENTION

In a computer system according to the present invention, the microprocessor can be replaced without changing the entire processor card. The computer's processor card includes a single socket which can be fitted with a 486SX, 487SX, or 486DX microprocessor. Any of these microprocessors can be plugged into the socket and be fully operational.

The 486SX, 487SX and 486DX all have different pin arrangements with differing numbers of signals. To correct for these variations in the pin arrangements of each processor, certain computer system signals must be routed to different pins for different microprocessors. Control of this routing is accomplished by a set of 3 switches which are set according to the type of microprocessor used. The three switches are located on the processor card, and are set manually when a new processor is plugged into the socket. By appropriately setting the 3 switches, the correct signals will be provided to each pin of the microprocessor. This allows the use of only a single socket and yet numeric coprocessor support can be provided.

BRIEF DESCRIPTION OF THE DRAWINGS

A better understanding of the invention can be obtained when the description of the preferred embodiment is considered in conjunction with the following drawings in which:

FIGS. 2A, 2B, and 2C are top view pin diagrams of the 486DX, 487SX, and the 486SX microprocessors, respectively.

DETAILED DESCRIPTION OF THE PREFERRED EMBODIMENT

Figure 1:
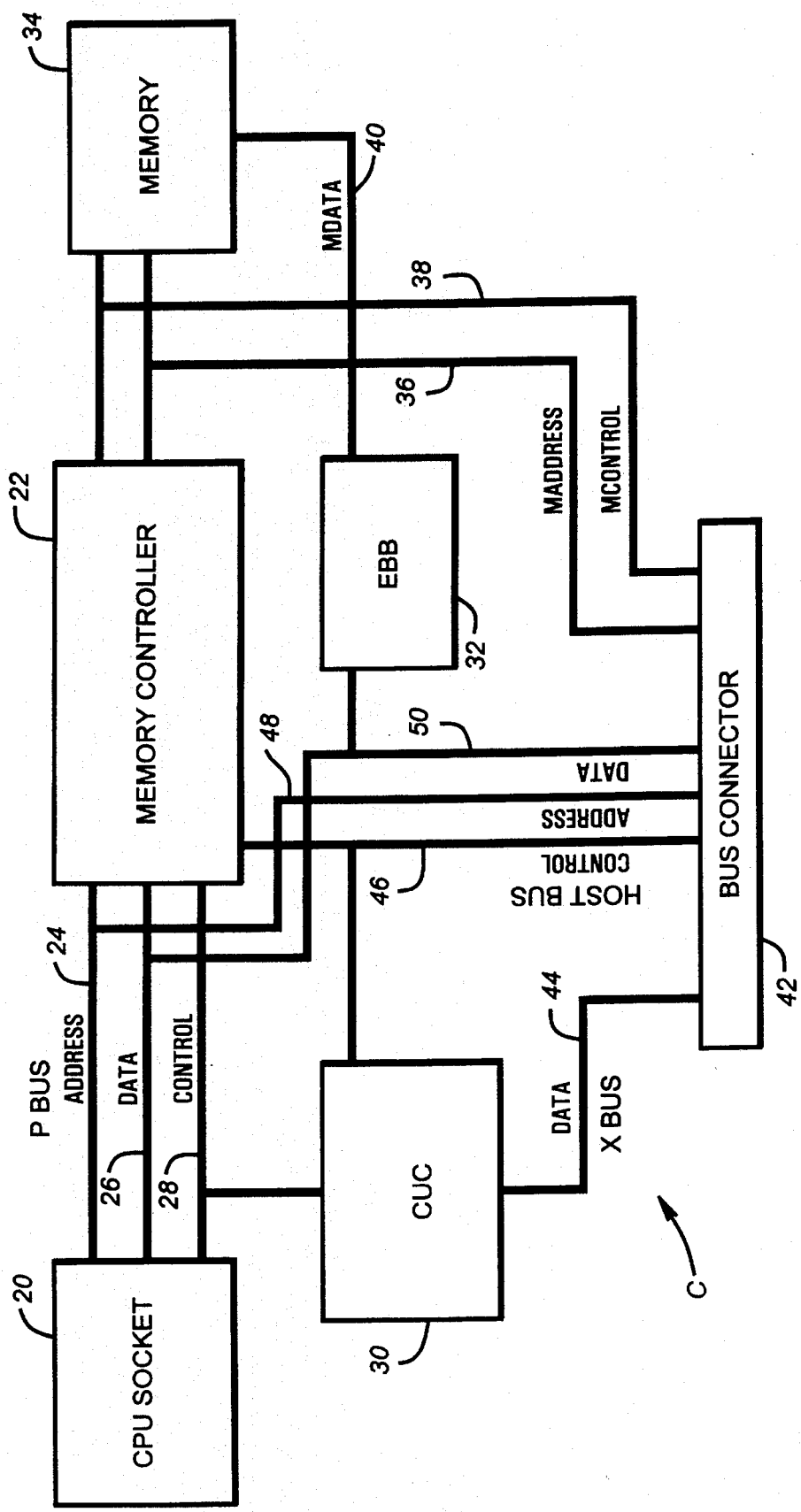
FIG. 1 is a block diagram of a microprocessor circuit card incorporating the present invention.

Referring now to FIG. 1, a block diagram of a microprocessor card C for use in a computer system includes a socket 20 for receiving a CPU or microprocessor chip. The microprocessor card C further includes a memory controller 22 connected to the CPU socket 20 by a P bus, comprising an address bus 24, a data bus 26, and a control bus 28. The CPU socket 20 is also connected to a CPU utility control (CUC)

circuit 30 by the P control bus 28. The CPU socket 20 is further connected to an EISA base memory data buffer (EBB) 32 by a host data bus 50 connected to the P data bus 26.

The memory controller 22 is also connected to base memory 34. The memory controller 22 and the base memory 34 are connected by the M address bus 36 and the M control bus 38. The base memory 34 is further connected to the EBB 32 by an M data bus 40.

Each of the components is connected to a bus connector 42. The bus connector 42 is connected to the CUC 30 by an X data bus 44, which is a form of an input/output (I/O) bus in the computer and a host control bus 46. The bus connector 42 is connected to the host control bus 46 and is connected to both the memory controller 22 and the CPU socket 20 by a host address bus 48 and a host data bus 50. The bus connector 42 is connected to the EBB 32 by the host data bus 50. Finally, the bus connector 42 receives the M address bus 36 and the M control bus 38.

Figure 2B:
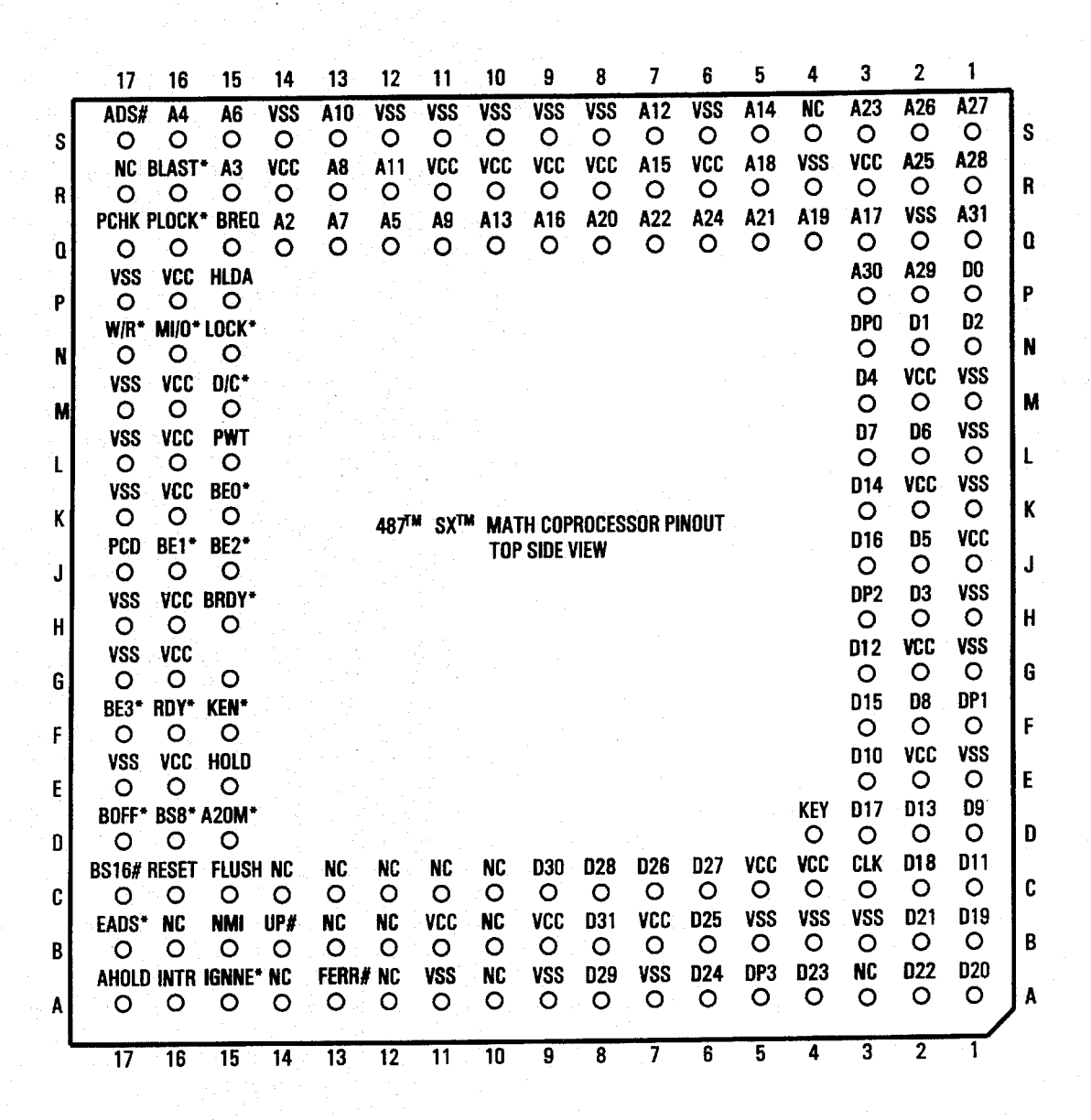

The microprocessor card C of the preferred embodiment is compatible with three types of microprocessors manufactured by Intel: the 486SX, the 487SX, and the 486DX. Each microprocessor type includes a family of different speed microprocessors having various characteristics and qualities, but sharing the same basic design and pin arrangement. As shown in FIGS. 2A, 2B and 2C and Table 1 below, each of the three types of microprocessors shares a common pin arrangement but for 5 pins. The connections of these 5 pins to the various signals of the computer system must be changed according to the particular type of microprocessor used.

TABLE 1

| Socket Pin | Signal | | |
|---|---|---|---|
| Number | 486SX | 487SX | 486DX |
| A13 | NC | FERR* | NC |
| A15 | NMI | IGNNE* | IGNNE* |
| B14 | NC | MP* | NC |
| B15 | NC | NMI | NMI |
| C14 | NC | NC | FERR* |

Pin A13 generates the FERR* (Floating Point Error) signal on the 487SX chip. The asterisk (*) indicates that the signal is asserted low and negated high. When asserted low, the FERR* signal indicates that a floating point error has occurred. The FERR* signal is supplied to the CUC 30. In the 486SX and 486DX microprocessors, pin A13 is not used, and should be unconnected.

For the 486DX microprocessor, the FERR* signal is generated on pin C14. Pin C14 is not used, however, on the 486SX and the 487SX microprocessors, and is thus not connected for those microprocessors.

Pin B15 receives the NMI (Non-Maskable Interrupt) signal from the computer system on the 487SX and the 486DX microprocessors. The NMI signal is generated by the computer system and supplied to the processor card C through the bus connector 42. When asserted high, the NMI signal indicates that a potentially fatal error has occurred in the system. This interrupt cannot be disabled and will always be serviced if active. Pin B15 is not used in the 486SX microprocessor, and therefore remains unconnected.

For the 486SX microprocessor, pin A15 receives the NMI signal. For the 487SX and 486DX microprocessors, on the other hand, pin A15 should receive the IGNNE* (Ignore Numeric Error) signal. The IGNNE* signal is asserted low and negated high. The IGNNE* signal, when asserted low by the CUC 30, instructs the processor to ignore a numeric error and continue executing floating point instructions. When the IGNNE* signal is negated high, the processor freezes a non-control floating point instruction if a previous floating point instruction caused an error. The IGNNE* signal is not used by the 486SX microprocessor.

Pin B14 is an extra pin found only on the 487SX microprocessor. Pin B14 generates the MP* (Math Present) signal, which is asserted low and negated high. The MP* signal is used in two socket configurations where a socket is provided for both the 486SX and 487SX microprocessors to indicate that a processor is present in the second socket. When the MP* signal is asserted, the 486SX microprocessor in the first socket allows the 487SX microprocessor in the second socket to control the bus. The MP* signal from the 487SX microprocessor is to be connected to various gates as suggested by Intel and in combination with other logic operates so that when the MP* signal is present the 486SX microprocessor generally enters a tri-state mode and certain other signals are rendered inactive and the 487SX microprocessor then controls operations. This signal is used only by the 487SX microprocessor. The pin at the B14 location on the 486SX and 486DX microprocessors is not connected.

Figure 3:
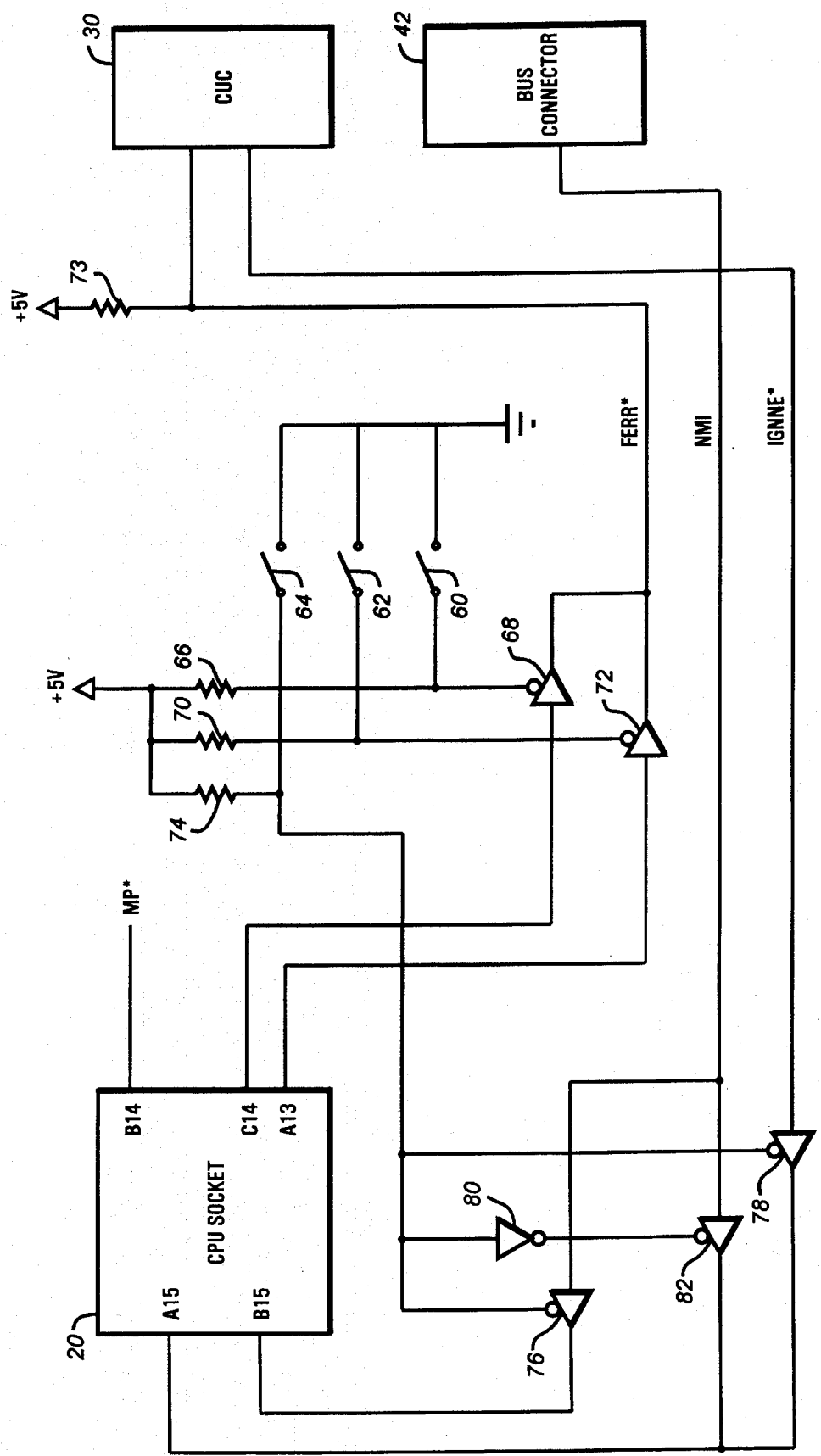
FIG. 3 is a schematic diagram of a circuit according to the present invention for routing various system signals to particular microprocessor pins.

Referring now to FIG. 3, the microprocessor card C according to the present invention includes the socket 20 that can receive any of the three microprocessor types. In the preferred embodiment, a set of switches 60, 62, and 64 on the processor card C control the routing of signals to and from pins A13, C14, B15 and A15. Because a connection to pin B14, the MP* signal on the 487SX microprocessor, is necessary only if the 487SX microprocessor is used with a 486SX microprocessor, and such is not the case on the present invention, pin B14 is left unconnected on the CPU socket 20. Each switch 60, 62 and 64 is a 2 position, preferably surface mount, switch. The switch 60 controls the routing of pin C14. As described above, pin C14 should be unconnected for the 486SX and the 487SX microprocessors, but generates the FERR* signal of the 486DX microprocessor. One side of the switch 60 is connected to ground, and the other side is connected to a resistor 66. The other end of the resistor 66 is connected to a 5 volt supply so that when switch 60 is open, a HIGH signal is generated at the node between the resistor 66 and the switch 60. The resistor 66 and the switch 60 are connected to the inverted enable input of a non-inverting tri-state buffer 68. If enabled, the buffer 68 allows a signal to pass through the buffer 68. If the buffer 68 is not enabled, the buffer 68 is in a tri-state mode and acts like an open circuit. The input of the buffer 68 is connected to pin C14 and the output of the buffer 68 is connected to the FERR*, input of the CUC 30. The buffer 68 is enabled by a LOW signal at its enable input. Thus, when the switch 60 is closed, a LOW signal is asserted at the enable input of the buffer 68, connecting the pin C14 of the microprocessor to the FERR* input. Therefore, when a 486DX microprocessor is used, the switch 60 should be closed. Otherwise, the switch 60 should be open, leaving pin C14 unconnected.

Similarly, a switch 62 controls the routing of pin A13 of the microprocessor. Pin A13 should be connected to the FERR* input of the CUC 30 when used with the 487SX microprocessor, and is not connected for the 486SX and 486DX microprocessors. One end of the switch 62 is connected to ground, and the other end of the switch 62 is connected to a resistor 70. The resistor 70 is connected to the 5 volt supply. The resistor 70 and the switch 62 are connected to the inverted enable input of a non-inverting tri-state buffer 72 identical to the buffer 68 described above.

The input of the buffer 72 is connected to pin A13 of the CPU socket 20, and the output of the buffer 72 is connected to the FERR* input of the CUC 30. When the switch 62 is closed, a LOW signal is asserted at the enable input of the buffer 72, connecting pin A13 to the FERR* signal. Because pin A13 should only be connected to the FERR* signal if the 487SX microprocessor is used, switch 62 should be closed only if a 487SX microprocessor is in the socket 20, and open if a 486SX or a 486DX microprocessor is used.

A pullup resistor 73 is connected between the 5 volt supply and the FERR* input of CUC 30 so that no error signal is provided when switches 60 and 62 are both open, as when a 486SX microprocessor is installed or as may accidentally occur. Therefore the FERR* input is at a known level in all cases and does not float.

The switch 64 controls the routing of signals to pin B15 and pin A15 of the CPU socket 30. One end of the switch 64 is connected to ground. The other end of the switch 64 is connected to a resistor 74, which is in turn connected to the 5 volt supply. The switch 64 and the resistor 74 are connected to the inverted enable inputs of 2 non-inverting tri-state buffers 76 and 78 and to the input of an inverter 80. The output of the inverter 80 is connected to the inverted enable input of another non-inverting tri-state buffer 82. According to this arrangement, when the first two buffers 76 and 78 are enabled, the third buffer 82 will be disabled, and conversely, when the third buffer 82 is enabled, the first two buffers 76 and 78 will be disabled. When the switch 64 is closed, the first two buffers 76 and 78 are enabled, and when the switch 64 is opened, the buffer 82 is disabled. The input of the first buffer 76 is connected to the NMI signal, and its output is connected to pin B15. The input of the second buffer 78 is connected to the IGNNE* signal, and its output is connected to pin A15. Therefore, when switch 64 is closed, pin B15 receives the NMI signal and pin A15 is connected to the IGNNE* signal.

When the switch 64 is open, however, the first two buffers 76 and 78 are disabled. Therefore, pin B15 is not connected. Pin A15, however, is connected to the output of the third buffer 82, which is enabled. The input of the third buffer 82 is connected to the NMI signal. When the 486SX microprocessor is being used, pin B15 should be unconnected and pin A15 should be receiving the NMI signal. When a 487SX or a 486DX microprocessor is being used, pin B15 should receive the NMI signal, and pin A15 should receive the IGNNE* signal. Therefore, for the 486SX microprocessor the switch 64 should be opened, and should be closed for the 487SX or the 486DX microprocessors.

Table 2 below illustrates the proper settings of the switches 60, 62 and 64 for the three microprocessors.

TABLE 2

| Switch | Signal | | |
|---|---|---|---|
| | 486SX | 487SX | 486DX |
| 60 | OFF | OFF | ON |
| 62 | OFF | ON | OFF |
| 64 | OFF | ON | ON |

Therefore, by correctly setting the 3 switches on the processor card, the same card can be compatible with any of the three microprocessor types. To upgrade the performance of the computer, the entire processor card does not have to be replaced. Instead, the previous processor may be removed from the socket and replaced with the new processor. The three switches are then set according to the type of the new microprocessor. This switching arrangement allows the use of only a single, microprocessor socket, saving precious space on the processor card C for other functions.

The foregoing disclosure and description of the invention are illustrative and explanatory thereof, and various changes in the size, shape, materials, components, circuit elements, wiring connections and contacts as well as in the details of the illustrated circuitry and construction may be made without departing from the spirit of the invention.

What is claimed is:

1. A microprocessor circuit card for use in a computer having a set of signals, comprising:

a single socket having a plurality of pins for interchangeably receiving one of a plurality of microprocessors, each of said microprocessors having a plurality of pins, some of which vary between said microprocessors so that some of said microprocessors receive or provide different signals from others of said microprocessors or provide or receive similar signals from differing pins; and signal control means for providing a connection between said socket pins corresponding to said varying microprocessor pins and the signals of the computer associated with said varying pins for each microprocessor, wherein said signal control means includes:

a first buffer having an input connected to one of the signals, an output connected to one of said corresponding socket pins, and an enable input;

a first switch means connected to said first buffer enable input for enabling and disabling said first buffer;

a second buffer having an output connected to a different one of said corresponding socket pins, an input connected to the same signal as said first buffer, and an enable input; and a second switch means connected to said second buffer enable input for enabling and disabling said second buffer.

2. A microprocessor circuit card according to claim 1, wherein said first switch means and said second switch means are manually operated.

3. A microprocessor circuit card according to claim 1, wherein said plurality of microprocessors include the 486SX microprocessor, the 487SX microprocessor and the 486DX microprocessor.

4. A microprocessor circuit card for use in a computer having a set of signals, comprising:

a single socket having a plurality of pins for interchangeably receiving one of a plurality of microprocessors, each of said microprocessors having a plurality of pins, some of which vary between said microprocessors so that some of said microprocessors receive or provide different signals from others of said microprocessors or provide or receive similar signals from differing pins; and signal control means for providing a connection between said socket pins corresponding to said varying microprocessor pins and the signals of the computer associated with said varying pins for each microprocessor, wherein said signal control means includes:

a first buffer having an input connected to one of the signals, an output connected to one of said corresponding socket pins, and an enable input;

a first switch means connected to said first buffer enable input for enabling and disabling said first buffer;

a second buffer having an input connected to a different signal from said first buffer, an output connected to the same corresponding socket pin as said first buffer and an enable input; and an inverter having an input connected to said first buffer enable input and an output connected to said second buffer enable input.

5. A microprocessor circuit card according to claim 4, wherein said signal control means further includes:

a third buffer having an output connected to a different one of said corresponding socket pins, an input connected to the same signal as said second buffer and an enable input connected to said first buffer enable input.

6. A microprocessor circuit card for use in a computer having a set of signals, comprising:

a single socket having a plurality of pins for interchangeably receiving one of a plurality of microprocessors, each of said microprocessors having a plurality of pins, some of which vary between said microprocessors so that some of said microprocessors receive or provide different signals from others of said microprocessors or provide or receive similar signals from differing pins; and signal control means for providing a connection between said socket pins corresponding to said varying microprocessor pins and the signals of the computer associated with said varying pins for each microprocessor, wherein said signal control means includes:

a first buffer having an input connected to one of said corresponding socket pins, an output connected to one of the signals, and an enable input;

a first switch means connected to said first buffer enable input for enabling and disabling said first buffer;

a second buffer having an input connected to a different one of said corresponding socket pins, an output connected to the same signal as said first buffer, and an enable input; and a second switch means connected to said second buffer enable input for enabling and disabling said second buffer.

7. A microprocessor circuit card according to claim 6, wherein said first switch means and said second switch means are manually operated.

8. A microprocessor circuit card according to claim 6, wherein said plurality of microprocessors includes the 486SX microprocessor, the 487SX microprocessor and the 486DX microprocessor.

9. A microprocessor circuit card for use in a computer having a set of signals, comprising:

a single socket having a plurality of pins, wherein said plurality of socket pins includes first, second, third and fourth socket pins, said single socket for interchangeably receiving one of a plurality of microprocessors, each of said microprocessors having a plurality of pins, some of which vary between said microprocessors so that some of said microprocessors receive or provide different signals from others of said microprocessors or provide or receive similar signals from differing pins, wherein said different signals include first, second and third signals; and signal control means for providing a connection between said first, second, third and fourth socket pins corresponding to said varying microprocessor pins and said first, second and third signals of the computer associated with said varying pins for each microprocessor, wherein said signal control means includes:

a first buffer having an input connected to said first signal, an output connected to said first socket pin, and an enable input;

first switch means connected to said first buffer enable input for enabling and disabling said first buffer;

a second buffer having an input connected to said second signal, an output connected to said first socket pin and an enable input;

an inverter having an input connected to said first buffer enable input and an output connected to said second buffer enable input;

a third buffer having an output connected to said second socket pin, an input connected to said second signal and an enable input connected to said first buffer enable input;

a fourth buffer having an input connected to said third socket pin, an output connected to said third signal and an enable input;

a second switch means connected to said fourth buffer enable input for enabling and disabling said fourth buffer;

a fifth buffer having an input connected to said fourth socket pin, an output connected to said third signal, and an enable input; and third switch means connected to said fifth buffer enable input for enabling and disabling said fifth buffer.

10. A microprocessor circuit card according to claim 9, wherein said plurality of microprocessors includes the 486SX microprocessor, the 487SX microprocessor and the 486DX microprocessor.

\* \* \* \* \*